(12) United States Patent
Oh et al.

(10) Patent No.: US 11,035,323 B2
(45) Date of Patent: Jun. 15, 2021

(54) ACTIVE PURGE SYSTEM AND ACTIVE PURGE METHOD

(71) Applicants: HYUNDAI MOTOR COMPANY, Seoul (KR); KIA MOTORS CORPORATION, Seoul (KR)

(72) Inventors: Young-Kyu Oh, Gwacheon-si (KR); Keum-Jin Park, Anyang-si (KR); Se-Geun Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/738,099

(22) Filed: Jan. 9, 2020

(65) Prior Publication Data
US 2020/0347805 A1  Nov. 5, 2020

(30) Foreign Application Priority Data

May 3, 2019 (KR) .................. 10-2019-0052163

(51) Int. Cl.
*F02M 25/08* (2006.01)
*F02D 41/14* (2006.01)
*F02D 19/06* (2006.01)
*F02D 41/00* (2006.01)

(52) U.S. Cl.
CPC ..... *F02M 25/0836* (2013.01); *F02D 19/0621* (2013.01); *F02D 41/003* (2013.01); *F02D 41/004* (2013.01); *F02D 41/0032* (2013.01); *F02D 41/0045* (2013.01); *F02D 41/1467* (2013.01); *F02M 25/089* (2013.01)

(58) Field of Classification Search
CPC .............. F02M 25/0836; F02M 25/089; F02D 41/1467; F02D 41/0045; F02D 41/003; F02D 41/0032; F02D 41/004; F02D 19/0621
USPC ......................................................... 123/520
See application file for complete search history.

(56) References Cited

U.S. PATENT DOCUMENTS

| 6,575,132 B1* | 6/2003 | Ernst ..................... F02B 23/101 123/295 |
| 2007/0023003 A1* | 2/2007 | Oechsle .............. F02D 41/3023 123/299 |
| 2016/0305361 A1* | 10/2016 | Akita .................. F02D 41/0002 |
| 2017/0342917 A1* | 11/2017 | Dekar ................ F02M 25/0854 |
| 2020/0217262 A1* | 7/2020 | Yoshioka ................ F02D 43/00 |

FOREIGN PATENT DOCUMENTS

KR     10-2004-0023161 A     3/2004

* cited by examiner

*Primary Examiner* — Mahmoud Gimie
(74) *Attorney, Agent, or Firm* — Brinks Gilson & Lione

(57) ABSTRACT

An active purge system may include: a canister to collect therein an evaporation gas evaporated from a fuel tank; a purge line to connect the canister to an intake pipe; a purge pump to pressurize the evaporation gas to allow the evaporation gas to move from the canister to the intake pipe; a purge valve installed on the purge line to be located between the purge pump and the intake pipe; and an engine connected to the intake pipe. In particular, the engine includes an injector installed on a cylinder head, an intake valve, and an exhaust valve.

9 Claims, 7 Drawing Sheets

ACTIVE PURGE SYSTEM AND ACTIVE PURGE METHOD

CROSS-REFERENCE TO RELATED APPLICATION

This application claims priority to and the benefit of Korean Patent Application No. 10-2019-0052163, filed on May 3, 2019, the entire contents of which are incorporated herein by reference.

FIELD

The present disclosure relates to an active purge system and an active purge method capable of reducing or minimizing generation of particle matters (PMs) and a particle number (PN).

BACKGROUND

The statements in this section merely provide background information related to the present disclosure and may not constitute prior art.

Evaporation gas is generated in a fuel tank according to variation in atmospheric pressure and temperature. When the evaporation gas is excessively generated in the fuel tank, there is a high possibility that the fuel tank is destroyed or the evaporation gas leaks into the atmosphere from the fuel tank. In order to prevent the fuel tank from being destroyed or the evaporation gas from leaking into the atmosphere, the evaporation gas should be appropriately removed from the fuel tank.

A purge line is installed between the fuel tank and an intake manifold, and the evaporation gas moves from the fuel tank to the intake manifold due to a negative pressure caused by a pumping pressure of an engine and applied to the purge line. However, we have discovered that when a supercharger is applied to the engine, a pressure of the intake manifold becomes similar to or higher than the atmospheric pressure such that there is a probability that a load is generated in the purge line but intake air may move from the intake manifold to the purge line.

Meanwhile, particulate matters (PMs) are contained in an exhaust gas. The PM is a soot particle having a very small size and is harmful to a human body.

Increased exhaust gas regulations limit PMs in the exhaust gas based on a number unit instead of a mass unit that is previously applied. A particle number (PN) means the number of PMs contained in the exhaust gas. A diesel particle filter (DPF), a gasoline particle filter (GPF), or the like, which collects PMs and then oxidizes the collected PMs through heat of an exhaust gas, is installed on an exhaust pipe. However, we have found that during evaporation gas treatment, hydrocarbon is added to a combustion chamber in addition to fuel such that there is a probability that a large amount of PMs may be generated.

SUMMARY

An embodiment of the present disclosure is directed to an active purge system and an active purge method which are capable of smoothly treating, even when a supercharger is applied to engine, an evaporation gas and reducing or minimizing generation of particulate matters (PMs) during evaporation gas treatment.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, an active purge system includes: a canister configured to collect therein an evaporation gas evaporated from a fuel tank, a purge line configured to connect the canister to an intake pipe, a purge pump configured to pressurize the evaporation gas to allow the evaporation gas to move from the canister to the intake pipe, a purge valve installed on the purge line to be located between the purge pump and the intake pipe, and an engine connected to the intake pipe, wherein the engine includes an injector installed on a cylinder head, an intake valve, and an exhaust valve.

Further, the injector may be located above a central portion of an upper surface of a piston, and the engine may further include a spark plug installed on the cylinder head.

In one form, the spark plug may be installed on the cylinder head such that an end portion of the spark plug in which a spark is generated is directed toward an end portion of the injector, and the end portion of the spark plug may be closer to the upper surface of the piston than the end portion of the injector.

In another form, the active purge system may further include a controller configured to control the purge pump, the purge valve, the injector, and the spark plug, and, when a revolution per minute (RPM) of the engine is in a low or intermediate speed range, the controller may operate the injector and the spark plug to allow fuel injection to take place during an intake stroke and allow fuel injection to take place immediately before or simultaneously with ignition during an explosion stroke.

Further, the controller may control an RPM of the purge pump and an opening or closing timing and an opening degree amount of the purge pump according to signals generated from a first pressure sensor, which is installed on the purge line to be located between the purge pump and the purge valve, and a second pressure sensor, which is installed on the purge line to be located between the canister and the purge pump, and vary operation patterns of the injector and the spark plug according to operations of the purge pump and the purge valve.

In one form, when the purge pump and the purge valve are operated, the controller may reduce a fuel injection holding time via the operation of the injector and retard or advance an ignition timing through the operation of the spark plug.

In another form, the engine may further include a valve control device installed on the cylinder head so as to control operations of the intake valve and the exhaust valve, the valve control device may vary an operation timing, an operation holding time, and a degree of an operation of each of the intake valve and the exhaust valve, and the controller may control an operation of the valve control device according to the RPM of the purge pump, the opening or closing timing of the purge valve, the opening degree amount of the purge valve, the RPM and a load of the engine, a temperature of an exhaust gas, and an amount of oxygen contained in the exhaust gas.

Further, when the RPM of the engine is in a low or intermediate speed region and the load of the engine is small, the controller may operate the valve control device to allow the intake valve to be closed during a compression stroke.

In other form, the engine may further include an exhaust gas recirculation (EGR) device configured to circulate an exhaust gas discharged from an exhaust pipe to the intake pipe, and the controller may control the operations of the injector and the spark plug according to an amount of a circulation gas from the exhaust pipe to the intake pipe via the EGR device, the RPM of the purge pump, the opening or closing timing of the purge valve, and the opening degree amount of the purge valve.

Further, the fuel injection holding time through the operation of the injector may be reduced according to an amount of the evaporation gas introduced into the intake pipe and an amount of the circulation gas due to the operations of the purge pump and the purge valve, and an ignition timing due to the operation of the spark plug may be retarded or advanced.

In accordance with another embodiment of the present disclosure, an active purge method may include: varying a fuel injection timing by the injector and an ignition timing by the spark plug based on the RPM of the engine; calculating, by a controller, a target purge amount to be processed, based on the evaporation gas collected in the canister; operating the purge pump at a specific RPM and the purge valve with a specific opening degree amount and a specific opening or closing timing so as to satisfy the target purge amount; and reducing an fuel injection amount from the injector and retarding or advancing the ignition timing by the operation of the spark plug based on an amount of the evaporation gas introduced into the intake pipe via the operations of the purge pump and the purge valve.

In one form, the varying of the fuel injection timing and the ignition timing of the engine may include: when the RPM of the engine is in a low or intermediate speed range, operating the injector and the spark plug to allow fuel injection to take place during an intake stroke and allow fuel injection to take place immediately before or simultaneously with ignition during an explosion stroke.

In another form, the varying of the fuel injection timing and the ignition timing of the engine may include: when the RPM of the engine is in a low or intermediate speed range and a load of the engine is small, varying an operation pattern of the intake valve so as to allow the intake valve to be closed during a compression stroke.

Further, the reducing of the fuel injection amount and retarding or advancing the ignition timing of the spark plug may include: when a circulation gas is introduced into the engine due to an operation of an exhaust gas recirculation (EGR) device, varying an operation pattern of the injector to decrease or increase the fuel injection amount from the injector based on a temperature of an exhaust gas and an amount of oxygen contained in the exhaust gas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
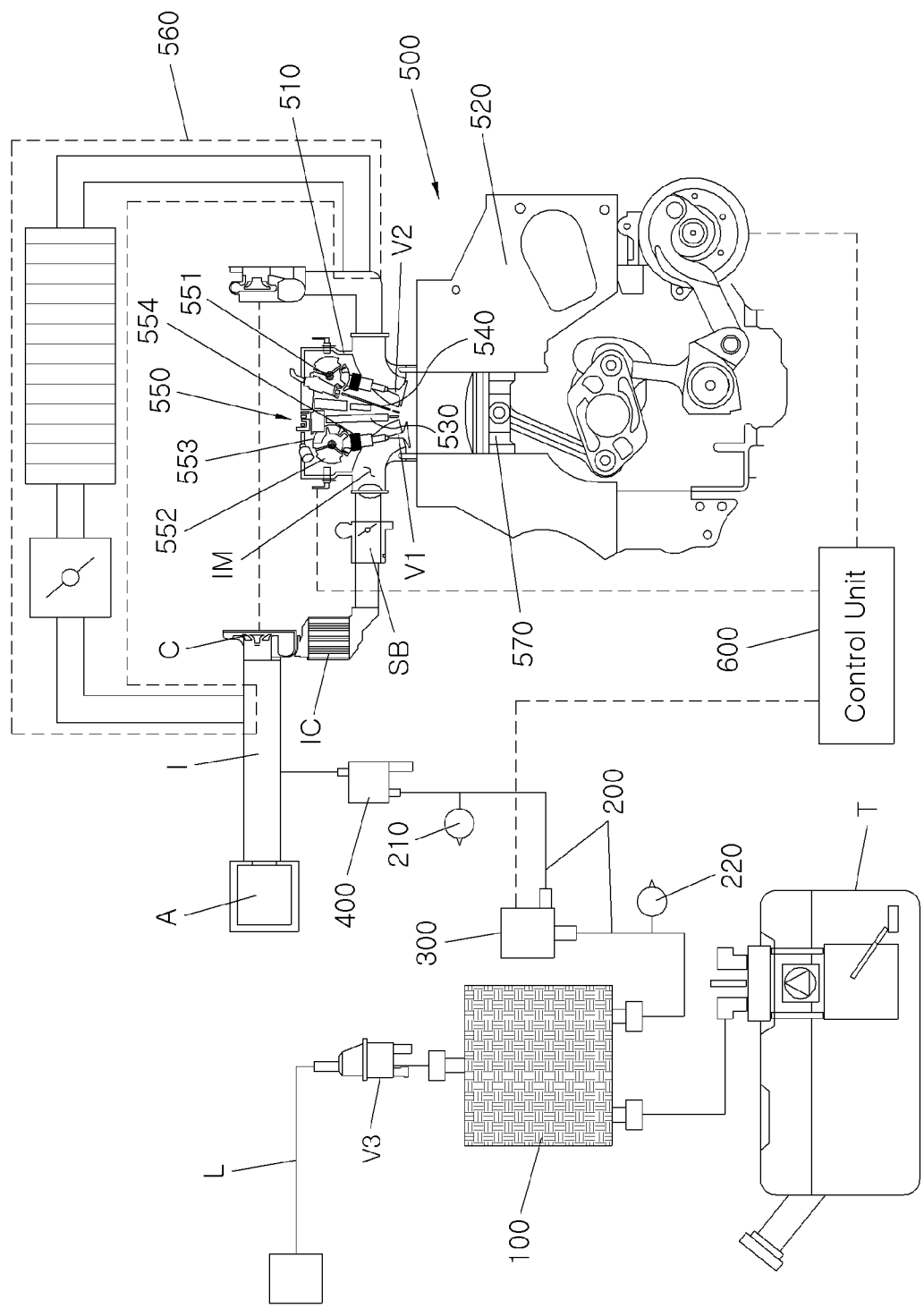
FIG. 1 is an exemplary diagram illustrating an active purge system according to one embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an active purge system and an active purge method according to one embodiment of the present disclosure will be described with reference to the accompanying drawings.

As shown in FIGS. 1 to 6, an active purge system according to one embodiment of the present disclosure includes: a canister 100 configured to collect an evaporation gas which is evaporated in a fuel tank T, a purge line 200 configured to connect the canister 100 to an intake pipe I, a purge pump 300 configured to pressurize the evaporation gas to transfer the pressurized evaporation gas from the canister 100 to the intake pipe I, a purge valve 400 installed on the purge line 200 to be located between the purge line 200 and the intake pipe I, and an engine 500 connected to the intake pipe I. The engine 500 includes an injector 530 installed on a cylinder head 510 and located between an intake valve V1 and an exhaust valve V2, a spark plug 540 installed on the cylinder head 510, a valve control device 550 configured to vary an operation timing, an operation holding time, and a degree of an operation of each of the intake valve V1 and the exhaust valve V2 which are provided on an upper portion of a cylinder, and an exhaust-gas recirculation (EGR) valve 560 configured to circulate an exhaust gas from an exhaust pipe, from which the exhaust gas is discharged from the engine 500, to the intake pipe I. The purge pump 300, a purge valve 400, the injector 530, the spark plug 540, and the valve control device 550 are controlled by a control unit (e.g., a controller) 600. Here, the control unit or controller for the engine may be embodied in a hardware manner (e.g., a processor), a software manner, or combination of the hardware and the software manner (i.e., a series of commands), which process at least one function or operation.

Figure 2:
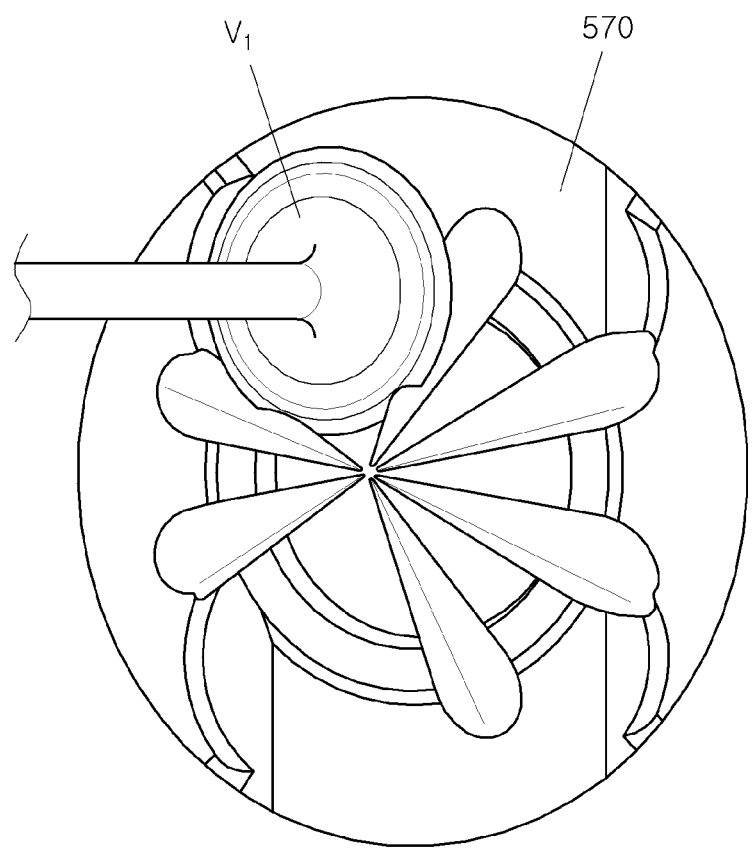
FIGS. 2 and 3 are exemplary diagrams illustrating injection of fuel from an injector installed on a cylinder head.
Figure 3:
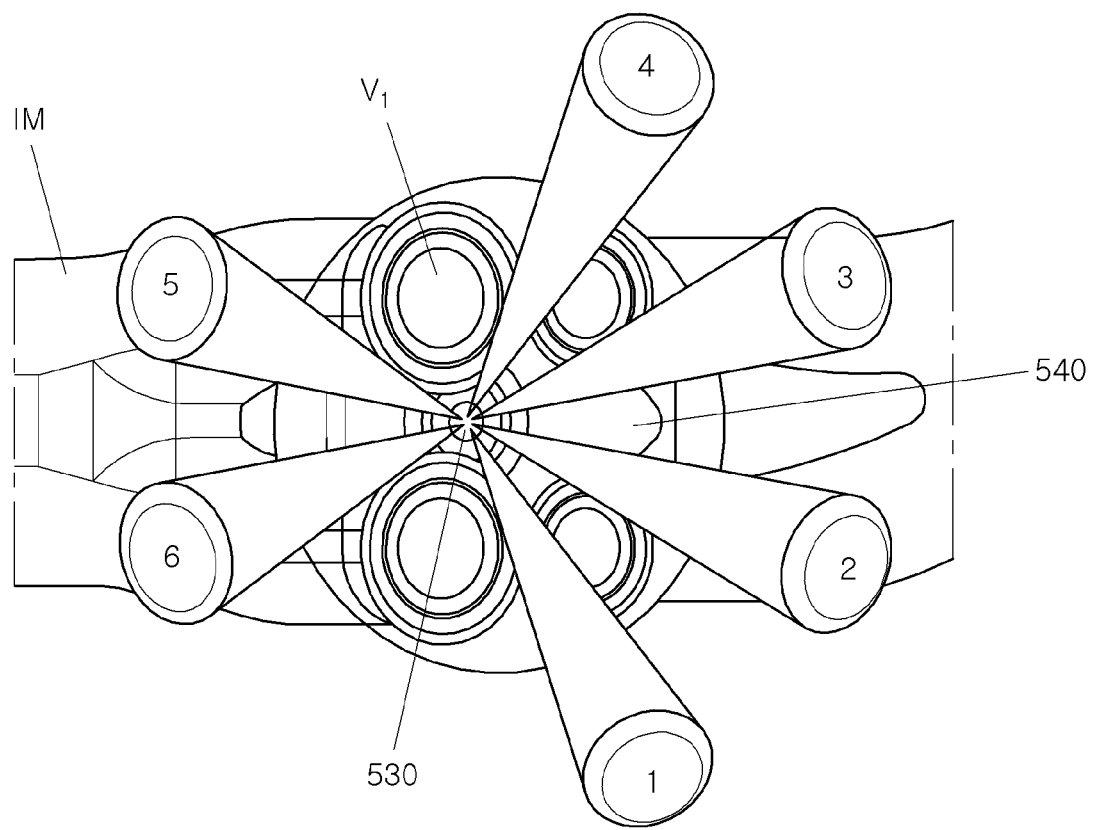

The injector 530 is located above a central portion of an upper surface of a piston. The injector 530 is connected to a fuel pump which pressurizes fuel with a predetermined magnitude and supplies the pressurized fuel. The fuel pump is installed on an upper surface of the engine 500. When the fuel is pressurized, the fuel pump prevents generation of air in the fuel due to a variation in temperature. An injection pattern of the injector 530 is varied through duty control. As shown in FIGS. 2 and 3, the injector 530 performs fuel injection at least once during an intake stroke, selectively performs the fuel injection during a compression stroke, and injects fuel immediately before or simultaneously with an operation of the spark plug 540 during an explosion stroke.

As the fuel is injected immediately before or simultaneously with the operation of the spark plug 540 during the explosion stroke, a mixing ratio around the spark plug 540 may be appropriately induced at an ignition timing. A formation of an initial flame is easy and a flame diffusion may generate uniform combustion by making a combustion chamber atmosphere lean through the fuel injection during the intake stroke and appropriately inducing the mixing ratio around the spark plug 540 at the ignition timing.

Figure 4:
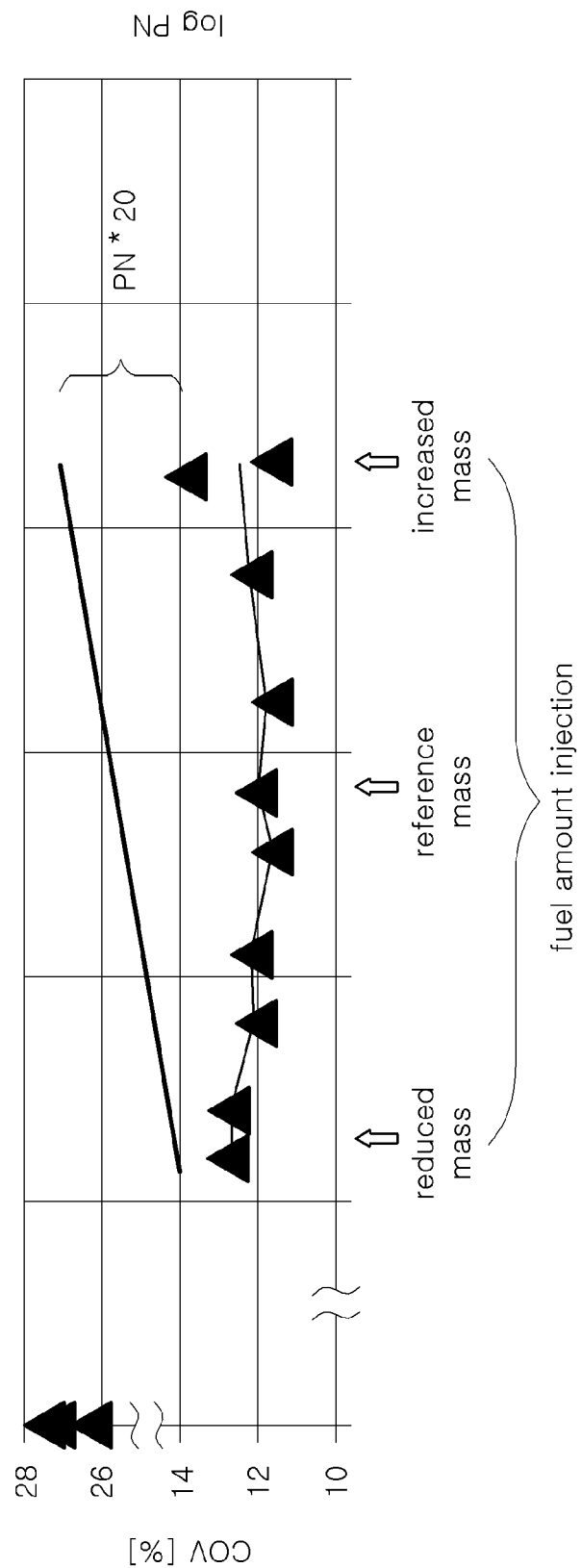
FIG. 4 is a graph showing a fuel amount injected immediately before ignition and combustion of variation (COV)
Figure 5:
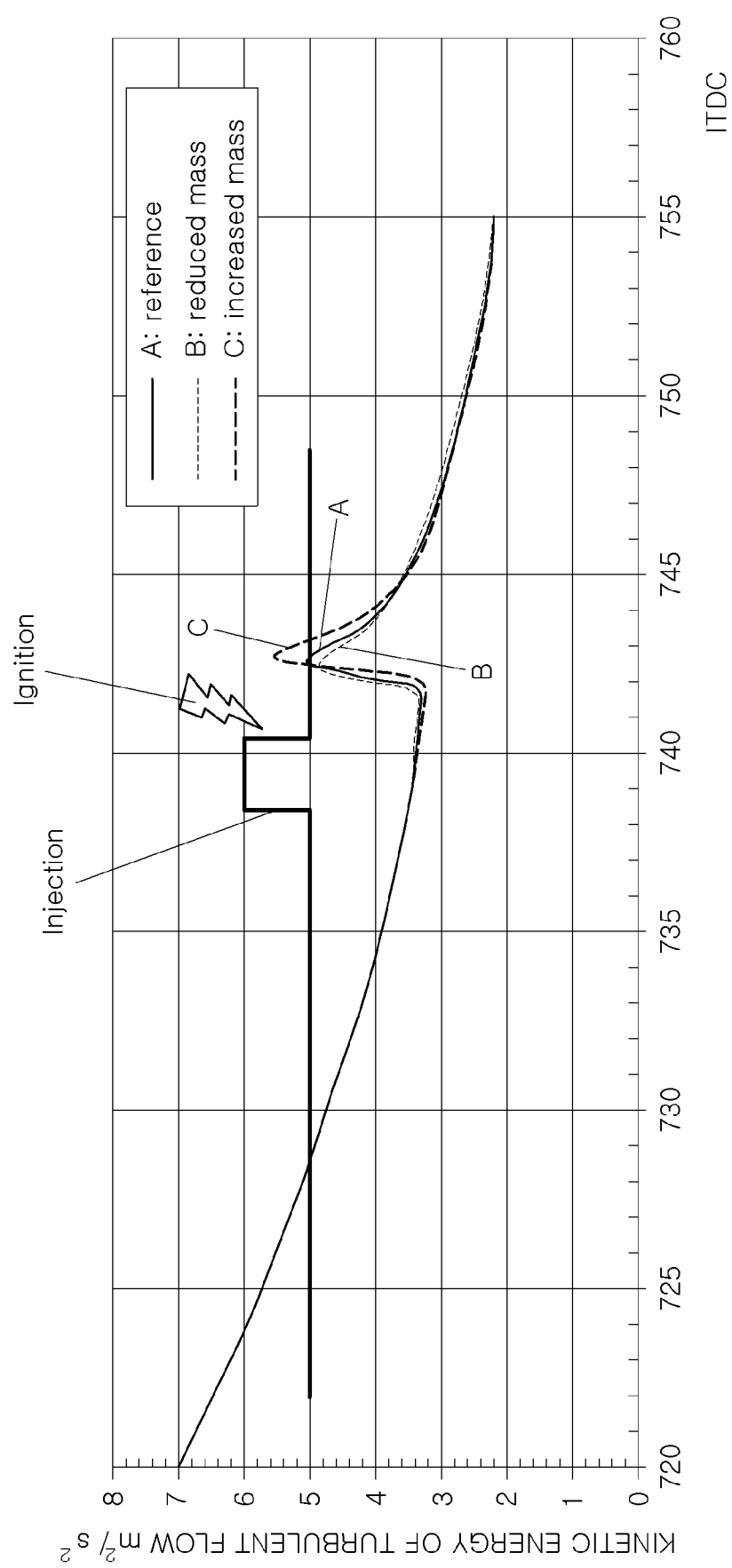
FIG. 5 is a graph showing kinetic energy of a turbulent flow around a spark plug immediately before ignition.

In particular, as shown in FIGS. 4 and 5, a degree of generation of particulate matters (PMs), combustion of variation (COV), and kinetic energy of a turbulent flow around the spark plug 540 may be controlled according to a magnitude of an amount of fuel injected immediately before ignition. As shown in FIG. 4, when fuel is injected less or more than a reference value, the COV increases slightly. and when the fuel is injected less than the reference value, a particle number (PN) value is small as compared with the case in which the fuel is injected the reference value or the fuel is injected more than the reference value. Meanwhile, as shown in FIG. 5, the kinetic energy of the turbulent flow is smallest at the reference value, and when the fuel is injected more than the reference value, the kinetic energy of the turbulent flow is largest. Therefore, on the basis of a revolution per minute (RPM) of the engine 500, a temperature of an exhaust gas, an amount of oxygen contained in the exhaust gas, and the like, it is possible to prevent incomplete combustion and, simultaneously, reduce or minimize generation of the PMs through control of increasing or decreasing an amount of fuel injected immediately before or simultaneously with ignition.

The spark plug 540 is installed on the cylinder head 510 such that an end portion of the spark plug 540 on which a spark is generated is directed toward an end portion of the injector 530. The end portion of the spark plug 540 is installed on the cylinder head so as to be closer to an upper surface of the piston than the end portion of the injector 530. An operation timing of the spark plug 540 may be varied according to the RPM of the engine 500, the temperature of the exhaust gas, the amount of oxygen contained in the exhaust gas, and a fuel injection pattern of the injector 530.

As shown in FIG. 1, the canister 100 is connected to the atmosphere through a line L. A vent valve V3 is provided on the line L. The vent valve V3 blocks air introduced into the canister 100 from the outside and discharges only air from the canister 100 to the outside. The vent valve V3 includes a filter for preventing an evaporation gas from being discharged through a line and a check valve for limiting a flow direction of the air.

An air cleaner A is installed on an end portion of the intake pipe I. A compressor C which is interlocked with a turbocharger mounted on the exhaust pipe is installed on the intake pipe I. An intercooler IC is located between the compressor C and an intake manifold IM. A throttle body SB is located between the intercooler IC and the intake manifold IM. A throttle valve, a sensor for measuring an amount of an opening degree of the throttle valve, and a sensor for measuring a pressure and a flow rate of intake air moving through the throttle valve are provided in the throttle body SB.

The purge pump 300 is manufactured to maintain or change an RPM at approximately 60000, 45000, or 30000 for a unit time. An opening or closing amount and an opening or closing timing of the purge valve 400 is controlled together with control of the RPM by the purge pump 300 such that a concentration and a density of an evaporation gas concentrated between the purge pump 300 and the purge valve 400 of the purge line 200 may be estimated.

Operations of the purge pump 300 and the purge valve 400 are controlled according to pieces of information sensed by various sensors such that it is possible to adjust an amount of an evaporation gas flowing from the purge line 200 to the intake pipe I and non-linearly adjust a flow rate of an evaporation gas supplied from the canister 100 to the intake pipe I.

According to an example, a first pressure sensor 210 is provided on the purge line 200 to be located between the purge pump 300 and the purge valve 400, and a second pressure sensor 220 is provided on the purge line 200 to be located between the canister 100 and the purge pump 300. A target purge amount is determined from an amount of an evaporation gas collected in the canister 100. In order to satisfy the target purge amount, the concentration and the density of the evaporation gas concentrated between the purge pump 300 and the purge valve 400 are adjusted, and an opening degree amount and the opening or closing timing of the purge valve 400 are adjusted.

The concentration and the density of the evaporation gas concentrated between the purge pump 300 and the purge valve 400 are calculated by comparing a signal generated from the first pressure sensor 210 with a signal generated from the second pressure sensor 220. An amount, a density, and a concentration of the evaporation gas introduced from the purge line 200 into the intake pipe I are calculated according to the opening degree amount and the opening or closing timing of the purge valve 400. In order to satisfy the target purge amount, the RPM of the purge pump 300 and the opening degree amount and the opening or closing timing of the purge valve 400 are varied according to the signals generated from the first pressure sensor 210 and the second pressure sensor 220.

During the compression stroke, the valve control device 550 retards a closing timing of the intake valve V1 and induces a compression ratio to be smaller than an expansion ratio to simulate an Atkinson cycle. The valve control device 550 varies an operation timing, an operation holding time, a degree of an operation of each of the intake valve V1 and the exhaust valve V2. The valve control device 550 includes a shaft 551 located at an upper end of the intake valve V1 or the exhaust valve V2, a plurality of cams 552 unrestrainedly installed on the shaft 551, a roller guide portion 553 installed on the shaft 551 to be located on one side of the plurality of cams 552 and configured to relatively vary rotation angles of the plurality of cams 552 with respect to a rotation angle of the shaft 551, and a roller lift portion 554 located between the plurality of cams 552 and the intake valve V1 or the exhaust valve V2 and configured to vary a movement distance of the intake valve V1 or the exhaust valve V2 when the intake valve V1 or the exhaust valve V2 is pressurized by the plurality of cams 552.

An operation of the roller guide portion 553 is controlled through an operating logic, an operation map, and the like which are prepared in advance. Owing to an operation of the roller guide portion 553, it is possible to adjust a timing in which the plurality of cams 552 pressurize the intake valve V1 or the exhaust valve V2. The timing in which the plurality of cams 552 pressurize the intake valve V1 or the exhaust valve V2 is adjusted such that a continuous variable valve timing (CVVT) is implemented. Further, owing to the operation of the roller guide portion 553, it is possible to adjust a timing in which the intake valve V1 or the exhaust valve V2 is released from the pressurization of the plurality of cams 552. The timing in which the intake valve V1 or the exhaust valve V2 is released from the pressurization of the plurality of cams 552 is adjusted such that a continuously variable valve duration (CVVD) is implemented.

An operation of the roller guide portion 553 is controlled through an operating logic, an operation map, and the like which are prepared in advance. Owing to an operation of the roller lift portion 554, when the plurality of cams 552 pressurize the intake valve V1 or the exhaust valve V2, a movement distance of the intake valve V1 or the exhaust valve V2 may be increased. The roller lift portion 554 includes an actuator (not shown). Owing to an operation of the actuator, the movement distance of the intake valve V1 or the exhaust valve V2 may be precisely increased. The movement distance of the intake valve V1 or the exhaust valve V2 is adjusted such that a continuously variable valve lift (CVVL) is implemented.

The control unit 600 receives signals from various sensors provided in the vehicle. The control unit 600 stores an operation map, a mathematical expression, a correction formula, a table, and the like in which the signals received from the various sensors are applied as variables. The control unit 600 operates the purge pump 300, the purge valve 400, the injector 530, the spark plug 540, and the valve control device 550 according to the operation map, the mathematical expression, the correction formula, and the table, and the like which are stored in the control unit 600.

When the RPM of the engine 500 is in a low or intermediate speed range, the control unit 600 operates the injector 530 and the spark plug 540 to allow fuel injection to take place during the intake stroke and allow fuel injection to take place immediately before or simultaneously with ignition during the explosion stroke. Since the fuel injection takes place immediately before or simultaneously with the ignition, a mixing ratio around the spark plug 540 may be appropriately induced and an ignition kernel may be easily generated. In particular, kinetic energy of a turbulent flow generated around the spark plug 540 is instantaneously maximized due to the fuel injection taking place during the explosion stroke such that flame propagation is easily generated.

According to the signals generated from the first pressure sensor 210, which is installed on the purge line 200 to be located between the purge pump 300 and the purge valve 400, and the second pressure sensor 220, which is installed on the purge line 200 to be located between the canister 100 and the purge pump 300, the control unit 600 controls the RPM of the purge pump 300 and the opening or closing timing and the opening degree amount of the purge valve 400. According to the operations of the purge pump 300 and the purge valve 400, the control unit 600 varies operation patterns of the injector 530 and the spark plug 540.

A target purge amount is determined in the control unit 600 according to the signals received from the sensors installed on the canister 100. In order to satisfy the determined target purge amount, an operation strategy of the purge pump 300 and the purge valve 400 is derived from the operation map or the table, which is prepared in advance. According to the derived operation strategy, the control unit 600 continuously transmits operating signals to the purge pump 300 and the purge valve 400 according to a time or the RPM of the engine 500. As the purge pump 300 and the purge valve 400 are operated, an evaporation gas is injected into the intake pipe I. The evaporation gas is oxidized with the fuel in the combustion chamber. When the target purge amount is determined, an amount of the evaporation gas which will be burned in the combustion chamber is also estimated. According to the estimated amount of the evaporation gas, the control unit 600 increases or decreases an amount of the fuel which will be injected from injector 530 and varies an injection pattern of the injector 530. Further, the control unit 600 retards or advances an operation timing of the spark plug 540.

According to an example, when the evaporation gas is supplied to the combustion chamber as the purge pump 300 and the purge valve 400 are operated, the control unit 600 decreases a fuel injection holding time due to the operation of the injector 530 to reduce an amount of the fuel which is supplied through the injector 530. Further, according to an expected mixing pattern of the fuel and intake air, the control unit 600 retards or advances an ignition timing so as to allow an ignition kernel to be generated in a state in which the fuel is completely mixed with the intake air.

The control unit 600 controls the operation of the valve control device 550 according to the RPM of the purge pump 300, the opening or closing timing of the purge valve 400, the opening degree amount of the purge valve 400, the RPM and a load of the engine 500, a temperature of an exhaust gas, and an amount of oxygen contained in the exhaust gas.

When the RPM of the engine 500 is in the low or intermediate speed range and the load of the engine 500 is small, the control unit 600 operates the valve control device 550 to allow the intake valve V1 to be closed during the compression stroke. A volume compressed during the compression stroke is decreased than a volume during the intake stroke, but, in the explosion stroke, the volume compressed during the compression stroke is maintained to be equal to the volume during the intake stroke. In a state in which an expansion ratio is greater than a compression ratio, the Atkinson cycle in which the engine 500 is operated is simulated. As the Atkinson cycle is simulated, a pumping loss is reduced and thus energy efficiency is increased.

The control unit 600 controls the operations of the injector 530 and spark plug 540 according to an amount of a circulation gas circulating from the exhaust pipe to the intake pipe I by the EGR device 560, the RPM of the purge pump 300, an opening timing of the purge valve 400, and an opening degree amount of the purge valve 400.

According to an example, the control unit 600 reduces the fuel injection holding time due to the operation of the injector 530 according to the amounts of the evaporation gas and the circulation gas which are introduced into the intake pipe I due to the operation of the purge pump 300 and the purge valve 400. Further, according to an expected mixing pattern of the fuel, the intake air, and the circulation gas, the control unit 600 retards or advances the ignition timing due to the operation of the spark plug 540 so as to allow an ignition kernel to be generated in a state in which the fuel, the intake air, and the circulation gas are completely mixed.

Figure 6:
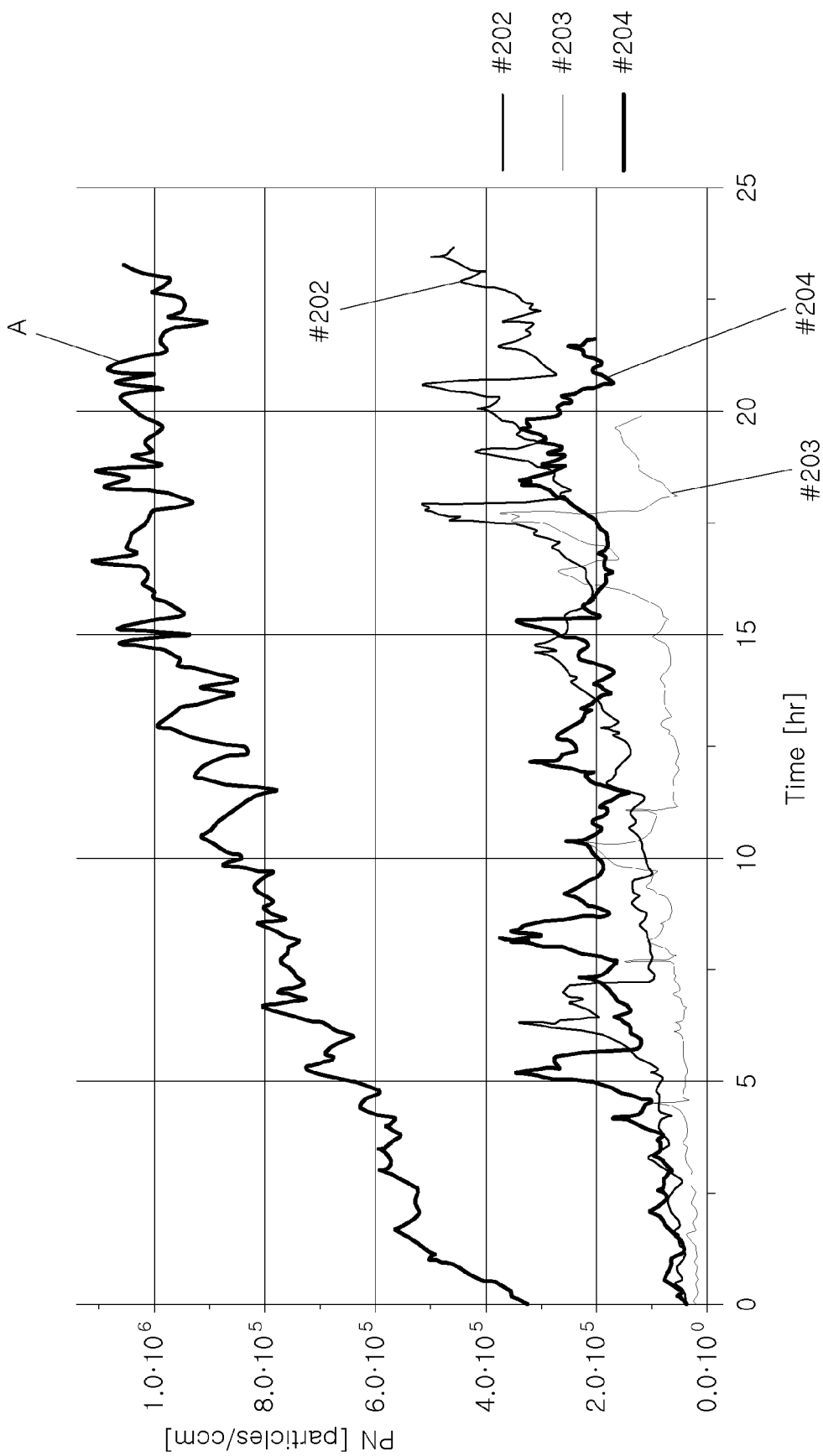
FIG. 6 is a graph showing particle number (PN) generation over time.

As shown in FIG. 6, when compared with a conventional case A in which the injector 530 is obliquely installed in a cylinder block 520, the active purge system configured as described above according to one embodiment of the present disclosure generates less PN. For each of #202, #203, and #204, the injector 530 described in the following Table 1 was used.

TABLE 1

| Items | #202 | #203 | #204 |
|---|---|---|---|
| Injection pressure [Mpa] | 35 | 35 | 35 |
| Qstat[g/min] | 492.5 | 492.5 | 492.5 |
| The number of holes | 6 | 6 | 5 |
| Feature | wide spray | compact | compact |

Figure 7:
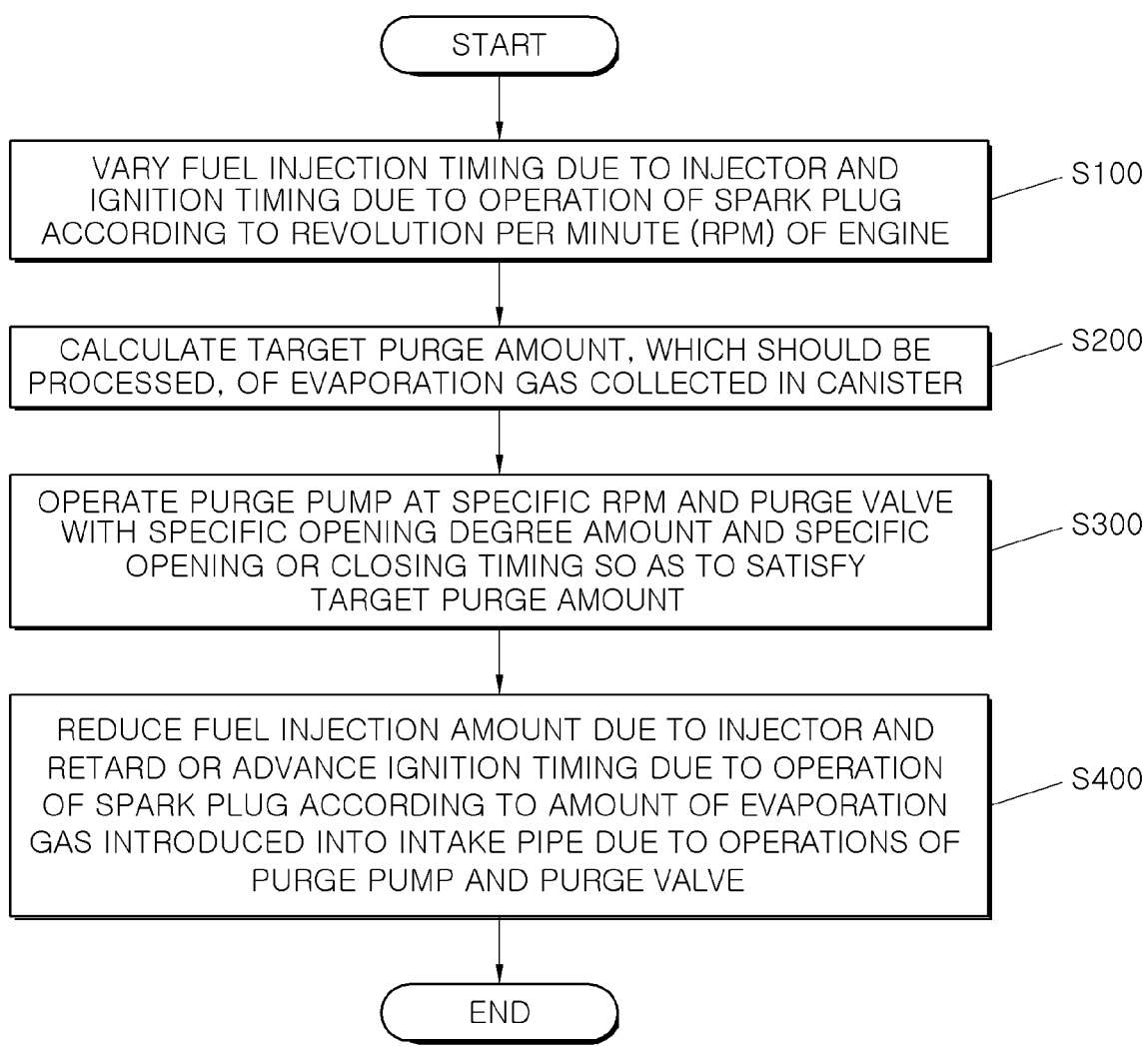
FIG. 7 is a flowchart illustrating an active purge method according to one embodiment of the present disclosure.

The active purge system configured as described above according to one embodiment of the present disclosure processes the evaporation gas according to a flowchart shown in FIG. 7 and, when the evaporation gas is processed, the active purge system varies the injection pattern of the injector 530 and the operation timing of the spark plug 540. As shown in FIG. 7, an active purge method according to one embodiment of the present disclosure includes varying the fuel injection timing due to the injector 530 and the ignition timing due to the operation of the spark plug 540 according to the RPM of the engine 500 (S100), calculating a target purge amount, which should be processed, of the evaporation gas collected in the canister 100 (S200), operating the purge pump 300 at a specific RPM and the purge valve 400 with a specific opening degree amount and a specific opening or closing timing so as to satisfy the target purge amount (S300), and reducing a fuel injection amount due to the injector 530 and retarding or advancing an ignition timing due to the operation of the spark plug 540 according to an amount of the evaporation gas introduced into the intake pipe I due to the operations of the purge pump 300 and the purge valve 400 (S400).

In the varying of the fuel injection timing due to the injector 530 and the ignition timing due to the operation of the spark plug 540 according to the RPM of the engine 500 (S100), when the RPM of the engine 500 is in a low or intermediate speed range, the injector 530 and the spark plug 540 are operated to allow fuel injection to take place during the intake stroke and allow fuel injection to take place immediately before or simultaneously with ignition during the explosion stroke.

In the varying of the fuel injection timing due to the injector 530 and the ignition timing due to the operation of the spark plug 540 according to the RPM of the engine 500 (S100), when the RPM of the engine 500 is in a low or intermediate speed range and a load of the engine 500 is low, an operation pattern of the intake valve V1 is varied to allow the intake valve V1 to be closed during the compression stroke.

In the reducing of the fuel injection amount due to the injector 530 and retarding or advancing an ignition timing due to the operation of the spark plug 540 according to an amount of the evaporation gas introduced into the intake pipe I due to the operations of the purge pump 300 and the purge valve 400 (S400), when the circulation gas is introduced into the engine 500 due to the operation of the EGR valve 560, an operation pattern of the injector 530 is varied according to a temperature of an exhaust gas and an amount of oxygen contained in the exhaust gas so as to decrease or increase the fuel injection amount due to the injector 530.

As described above, in accordance with the active purge system and the active purge method according to one embodiment of the present disclosure, the evaporation gas may be pressurized and injected into the intake pipe I due to the operations of the purge pump 300 and the purge valve 400 such that, even though a supercharger is applied to the engine 500, the evaporation gas may be supplied to the intake pipe I.

Further, since the injector 530 is installed on the cylinder head 510 to be located between the intake valve V1 and the exhaust valve V2, generation of PMs is substantially reduced or minimized. Since the fuel coated on an upper surface of the piston transfers heat to the piston even though being oxidized, there is a probability that the fuel is not completely burned to be converted into PMs. According to one embodiment of the present disclosure, when compared with a case in which the injector 530 is obliquely installed on the cylinder block 520 and the fuel is injected onto the upper surface of the piston to generate a tumble in the fuel so as to adjust a mixing ratio around the spark plug 540, the mixing ratio around the spark plug 540 may be adjusted with only the operation timing of the injector 530 such that the coating of the upper surface of the piston with the fuel may be reduced or minimized.

As described above, in accordance with the active purge system and the active purge method according to one embodiment of the present disclosure, an evaporation gas can be pressurized and injected into an intake pipe due to operations of a purge pump and purge valve such that, even though a supercharger is applied to an engine, an evaporation gas can be supplied to the intake pipe.

Further, since an injector is installed on a cylinder head to be located between an intake valve and an exhaust valve, generation of PMs can be reduced or minimized. Since the fuel coated on an upper surface of the piston transfers heat to the piston even though being oxidized, there is a probability that the fuel is not completely burned to be converted into the PMs. According to one embodiment of the present disclosure, when compared with a case in which the injector is obliquely installed on a cylinder block and fuel is injected onto the upper surface of the piston to generate a tumble in the fuel so as to adjust a mixing ratio around the spark plug, the mixing ratio around the spark plug may be adjusted with only the operation timing of the injector such that the coating of the upper surface of the piston with the fuel may be reduced or minimized.

While the present disclosure has been described with respect to the specific embodiments, it will be apparent to those skilled in the art that various changes and modifications may be made without departing from the spirit and scope of the present disclosure.

What is claimed is:

1. An active purge system, comprising:
a canister configured to collect therein an evaporation gas evaporated from a fuel tank;
a purge line configured to connect the canister to an intake pipe;
a purge pump configured to pressurize the evaporation gas to allow the evaporation gas to move from the canister to the intake pipe;
a purge valve installed on the purge line located between the purge pump and the intake pipe;
an engine connected to the intake pipe and including an injector installed on a cylinder head, an intake valve, a spark plug installed on the cylinder head, and an exhaust valve; and
a controller configured to control the purge pump, the purge valve, the injector, and the spark plug,
wherein the injector is located above a central portion of an upper surface of a piston,
wherein when a revolution per minute (RPM) of the engine is in a low or intermediate speed range, the controller is configured to operate the injector and the spark plug to allow fuel injection to take place during an intake stroke and allow fuel injection to take place immediately before or simultaneously with ignition during an explosion stroke,
wherein the controller is configured to control an RPM of the purge pump and an opening or closing timing and an opening degree amount of the purge valve based on signals generated from a first pressure sensor, which is installed on the purge line to be located between the purge pump and the purge valve, and a second pressure sensor, which is installed on the purge line to be located between the canister and the purge pump, and varies operation patterns of the injector and the spark plug according to operations of the purge pump and the purge valve, and wherein the engine further includes an exhaust gas recirculation (EGR) device configured to circulate an exhaust gas discharged from an exhaust pipe to the intake pipe, and the controller is configured to control the operations of the injector and the spark plug based on an amount of a circulation gas from the exhaust pipe to the intake pipe via the EGR device, the RPM of the purge pump, the opening or closing timing of the purge valve, and the opening degree amount of the purge valve.

2. The active purge system of claim 1, wherein:
the spark plug is installed on the cylinder head such that an end portion of the spark plug in which a spark is generated is directed toward an end portion of the injector; and
the end portion of the spark plug is closer to the upper surface of the piston than the end portion of the injector.

3. The active purge system of claim 1, wherein, when the purge pump and the purge valve are operated, the controller is configured to reduce a fuel injection holding time through the operation of the injector and to retard or advance an ignition timing via the operation of the spark plug.

4. The active purge system of claim 1, wherein:
the engine further includes a valve control device installed on the cylinder head and configured to control operations of the intake valve and the exhaust valve;
the valve control device is configured to vary an operation timing, an operation holding time, and a degree of an operation of each of the intake valve and the exhaust valve; and
the controller is configured to control an operation of the valve control device based on the RPM of the purge pump, the opening or closing timing of the purge valve, the opening degree amount of the purge valve, the RPM and a load of the engine, a temperature of an exhaust gas, and an amount of oxygen contained in the exhaust gas.

5. The active purge system of claim 4, wherein, when the RPM of the engine is in a low or intermediate speed region and the load of the engine is small, the controller is configured to operate the valve control device to allow the intake valve to be closed during a compression stroke.

6. The active purge system of claim 1, wherein:
a fuel injection holding time through the operation of the injector is reduced based on an amount of the evaporation gas introduced into the intake pipe and an amount of the circulation gas due to the operations of the purge pump and the purge valve; and
an ignition timing via the operation of the spark plug is retarded or advanced.

7. An active purge method of processing evaporation gas through an active purge system, the active purge method comprising:
varying a fuel injection timing by an injector and an ignition timing by a spark plug based on revolutions per minute (RPM) of an engine;
calculating, by a controller, a target purge amount to be processed, based on evaporation gas collected in a canister;
operating a purge pump at a specific RPM and a purge valve with a specific opening degree amount and a specific opening or closing timing so as to satisfy the target purge amount; and
reducing a fuel injection amount from the injector and retarding or advancing the ignition timing by the spark plug based on an amount of evaporation gas introduced into an intake pipe via operations of the purge pump and the purge valve,
wherein reducing the fuel injection amount and retarding or advancing the ignition timing includes: when a circulation gas is introduced into the engine due to an operation of an exhaust gas recirculation (EGR) device, varying an operation pattern of the injector to decrease or increase the fuel injection amount from the injector based on a temperature of an exhaust gas and an amount of oxygen contained in the exhaust gas.

8. The active purge method of claim 7, wherein varying the fuel injection timing and the ignition timing of the engine includes: when the RPM of the engine is in a low or intermediate speed range, operating the injector and the spark plug to allow fuel injection to take place during an intake stroke and allow fuel injection to take place immediately before or simultaneously with ignition during an explosion stroke.

9. The active purge method of claim 7, wherein varying the fuel injection timing and the ignition timing of the engine includes: when the RPM of the engine is in a low or intermediate speed range and a load of the engine is small, varying an operation pattern of an intake valve so as to allow the intake valve to be closed during a compression stroke.

* * * * *